May 15, 1951     E. MORGAN     2,553,466
STAND FOR BICYCLES
Filed Dec. 28, 1946
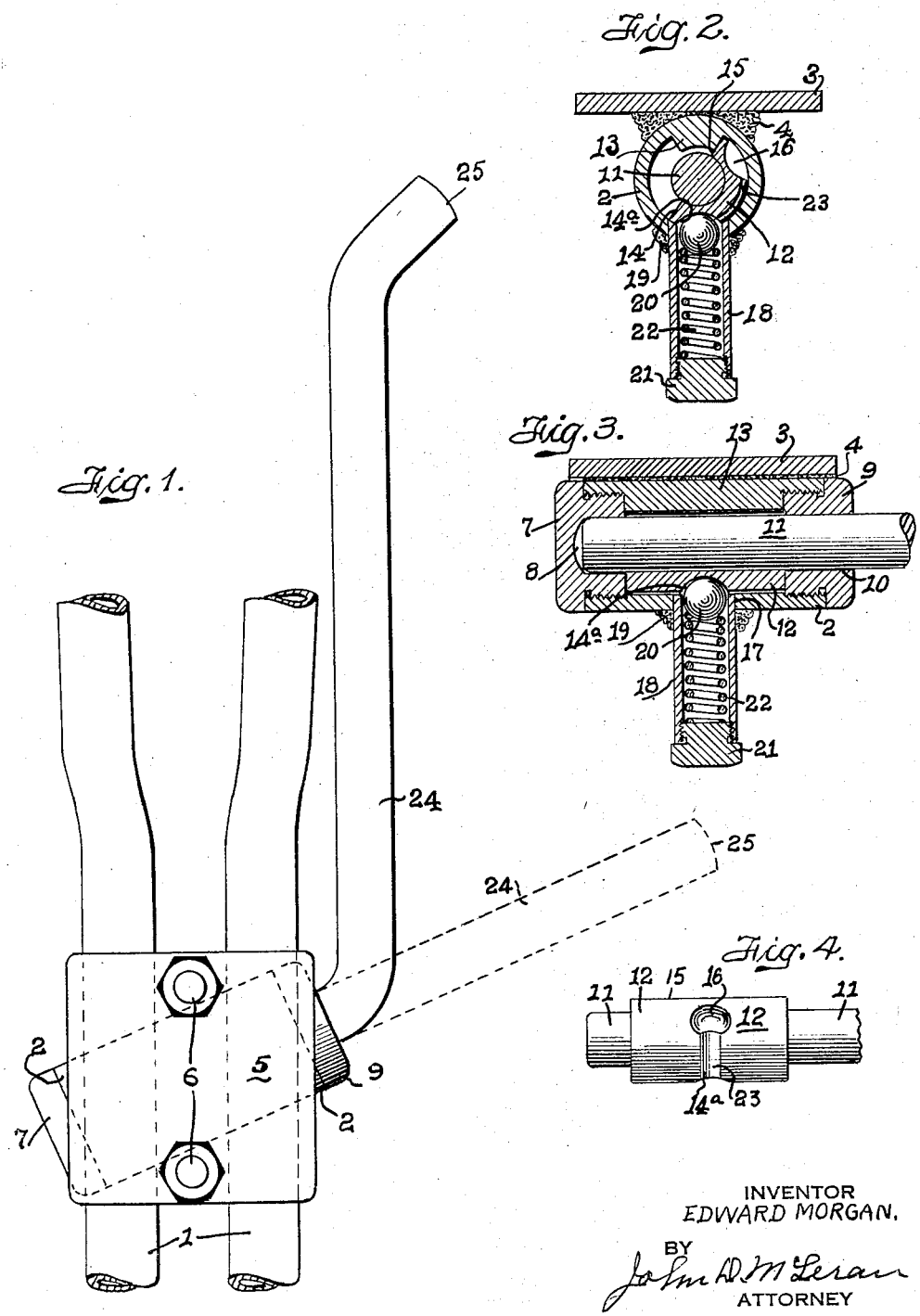
INVENTOR
EDWARD MORGAN.
BY
John D. McLeran
ATTORNEY Patented May 15, 1951

2,553,466

UNITED STATES PATENT OFFICE 2,553,466

STAND FOR BICYCLES

Edward Morgan, Dayton, Ohio

Application December 28, 1946, Serial No. 719,048

3 Claims. (Cl. 280—301)

This invention relates to improvments in Stands for Bicycles of the class termed "kick stand"; and it particularly relates to the manner of supporting a prop or sprag, by which the bicycle is supported. It is a particular object of this invention to provide a prop for a bicycle, in which the operating or moving parts are enclosed within a casing in such a manner that they are protected from dirt, dust, and unusual wear.

It is also an object of this invention to provide, in connection with props for bicycles, a mechanism that limits the rotary movement of the prop, and also prevents a longitudinal movement of the prop shaft independent of its bearings.

These and other objects and advantages will appear in the following description taken in connection with the drawings.

Figure 1 is a top plan view showing a prop or sprag attached to a bicycle with the prop in horizontal non-supporting position in solid line, and in dotted line in supporting position.

Figure 2 is a cross section through a supporting cylinder, showing the operating parts of the stand.

Figure 3 is a longitudinal section, through the supporting cylinder, showing the manner in which the prop is held against rotary movement and longitudinal movement.

Figure 4 is a view showing a cam member with pockets or depressions therein and a groove connecting the depressions.

The numeral 1 is used to designate or indicate a frame of a bicycle to which a cylinder 2 is attached by means of a plate 3 welded to the cylinder as indicated by numeral 4, and a plate 5 attached to plate 3 by means of a bolt 6. Between the plates 3 and 5 are the frame structures 1, as shown in Figure 1.

The cylinder 2 forms a housing for the moving parts and is open at each end, except for closures such as the closure cap 7, which has therein a socket 8 forming a bearing to support one end of a spindle 11. The other end of the cylinder, remote from the closure cap 7, is closed by closure cap 9, which has a hole 10 therein, through which the spindle 11 extends and in which it rotates on the spindle 11. Between the closure caps 7 and 9 is a cam member 12.

This cam member is securely attached to the spindle 11 in any suitable manner. It may be made integral with it, or welded on it, or frictionally supported thereon.

Within the cylinder 2 is a stop member 13 running longitudinal of the cylinder. On the cam member 12 are two stop members 14 and 15 adapted to engage a stop member 13 on the rotation of the cam member. Adjacent the stop member 14, is a pocket or depression 14a, and adjacent the stop member 15 is a similar depression 16. These depressions or pockets 14a and 16 are adapted to receive a ball 20, which will hold the cam member and the spindle 11 against longitudinal movement and against rotation without a considerable amount of force applied thereto.

On one side of the cylinder 2 is a hole 17, into which is fitted one end of the tubular housing 18. This housing is welded at 19 to the cylinder with the end thereof in the hole 17. In this housing is the ball 20 adapted to seat in the pockets 14a and 16. The end of the housing 18, remote from the cylinder 2, is closed by means of a plug 21. Between the plug 21 and the ball 20 is a spring 22, which urges the ball toward the cam member.

Between the two pockets 15 and 16 is a groove or a runway 23, through which the ball runs or rotates when the cam member is rotated for the purpose of supporting the bicycle, or holding a prop or sprag 24 in inoperative position.

In Figure 1, the prop or sprag 24, shown in inoperative position in solid line, is shown in dotted line in bicycle supporting position.

The stop 13 may be dispensed with, without destroying the efficiency of the stand.

The ball 20 resting in the pockets 14a and 16 serve to hold the rotary member or cam member 12 fixed with relation to the cylinder 2. In order to increase the efficiency of the holding effect of the ball 20, the spring 22 may be made heavier and stronger. In this event the space between the stop members 14 and 15 on the rotary member would be filled.

What I claim is:

1. In a stand for bicycles, a cylinder, a rotary member in said cylinder, said rotary member having a pair of pockets connected by a groove, and a spring operated member in the cylinder engaging the rotary member in the pockets and adapted to pass along the groove from one pocket to the other when the rotary member is rotated, said spring operated member serving to prevent the longitudinal movement of the rotary member in the cylinder.

2. In a bicycle stand, a cylinder, a rotary member in the cylinder, and means cooperating with the cylinder and said member to limit the rotation of the rotary member and to prevent the longitudinal movement of the rotary member in the cylinder, said means comprising a pair of pockets in the rotary member connected by a groove and a spring operated member in the cylinder for engaging the rotary member in the pockets and the groove.

3. In a bicycle stand, a cylinder having in one side a hole, a tubular member fitting in said hole, a rotor mounted in said cylinder, said rotor having therein a pair of pockets connected by a groove, a ball in said housing adapted to fit in the pockets and groove and a spring in said housing urging said ball toward the rotor, said ball fitting in said pockets and groove and adapted to hold the rotor against longitudinal movement and to limit the rotary movement thereof.

EDWARD MORGAN.

REFERENCES CITED

The following references are of record in the file of this patent:

UNITED STATES PATENTS

| Number | Name | Date |
| --- | --- | --- |
| 531,612 | Emery | Dec. 25, 1894 |
| 1,531,325 | White | Mar. 31, 1925 |
| 2,197,936 | Kraeft | Apr. 23, 1940 |
| 2,395,148 | Schwinn | Feb. 19, 1946 |